United States Patent
Wada et al.

(10) Patent No.: US 11,747,653 B2
(45) Date of Patent: *Sep. 5, 2023

(54) COLOR VISION CORRECTION FILTER AND OPTICAL COMPONENT

(71) Applicant: Panasonic Intellectual Property Management Co., Ltd., Osaka (JP)

(72) Inventors: Hideki Wada, Osaka (JP); Tomoya Iwahashi, Osaka (JP); Kazuyuki Yamae, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 981 days.

This patent is subject to a terminal disclaimer.

(21) Appl. No.: 16/441,407

(22) Filed: Jun. 14, 2019

(65) Prior Publication Data
US 2020/0004051 A1  Jan. 2, 2020

(30) Foreign Application Priority Data
Jun. 28, 2018  (JP) .................... 2018-123088

(51) Int. Cl.
| G02C 7/10 | (2006.01) |
| C09B 47/30 | (2006.01) |
| C09B 47/00 | (2006.01) |
| C09B 23/06 | (2006.01) |
| G02B 5/22 | (2006.01) |

(52) U.S. Cl.
CPC .............. *G02C 7/108* (2013.01); *C09B 23/06* (2013.01); *C09B 47/00* (2013.01); *C09B 47/30* (2013.01); *G02B 5/223* (2013.01); *G02C 7/10* (2013.01); *G02C 7/104* (2013.01)

(58) Field of Classification Search
CPC ......... G02B 5/223; C09B 23/06; C09B 23/08; G02C 7/104; G02C 7/108; G02C 7/10
See application file for complete search history.

(56) References Cited

U.S. PATENT DOCUMENTS

| 6,135,595 A | * 10/2000 | Takeshita | ............... | G02C 7/104 351/159.66 |
| 6,149,270 A | * 11/2000 | Hayashi | ................. | G02C 7/104 351/159.28 |
| 2008/0291394 A1 | * 11/2008 | Ishak | ....................... | G02C 7/10 351/159.6 |
| 2010/0149483 A1 | 6/2010 | Chiavetta, III | | |
| 2016/0077361 A1 | 3/2016 | Wold et al. | | |
| 2018/0239171 A1 | 8/2018 | Wold et al. | | |
| 2020/0400868 A1 | * 12/2020 | Wada | .................... | G02B 1/041 |

FOREIGN PATENT DOCUMENTS

| JP | 9313521 | 12/1997 |
| JP | H11-311756 A | 11/1999 |
| JP | 2001112811 | 4/2001 |
| JP | 2002303830 | 10/2001 |
| JP | 2002303830 | 10/2002 |
| JP | 2002303832 | 10/2002 |
| JP | 2014-134661 A | 7/2014 |
| JP | 5807237 | 9/2015 |
| JP | 6035152 | 11/2016 |
| JP | 2018-091900 A | 6/2018 |
| TW | 201727280 A | 8/2017 |
| WO | 2018/045040 A1 | 3/2018 |

OTHER PUBLICATIONS

Olchawa. Free Radical Biology and Medicine, 2015, 89, 873-882 (Year: 2015).*
Japanese Office Action for corresponding JP Patent Application No. 2018-123088 dated Oct. 26, 2021.
Taiwanese Office Action and Search Report for corresponding TW Patent Application No. 108122092 dated Apr. 27, 2021, with English translation of Search Report.
Japanese Office Action for corresponding JP Patent Application No. 2018-123088 dated May 10, 2022 and English machine translation.
German Office Action corresponding to German Patent Application 10 2019 116 904.6, dated Feb. 8, 2023, with English translation.

* cited by examiner

*Primary Examiner* — Noble E Jarrell

(74) *Attorney, Agent, or Firm* — Renner, Otto, Boisselle & Sklar, LLP

(57) ABSTRACT

A color vision correction filter includes a least one type of dye material and the lowest value of transmittance of the color vision correction filter in a wavelength band ranging from 440 nm to 600 nm, inclusive, is in the range of plus or minus 50 nm of 535 nm.

21 Claims, 14 Drawing Sheets

COLOR VISION CORRECTION FILTER AND OPTICAL COMPONENT

CROSS REFERENCE TO RELATED APPLICATION

This application claims the benefit of priority of Japanese Patent Application Number 2018-123088 filed on Jun. 28, 2018, the entire content of which is hereby incorporated by reference.

BACKGROUND

1. Technical Field

The present disclosure relates to a color vision correction filter and an optical component.

2. Description of the Related Art

Conventionally, spectacle lenses for assisting individuals having color vision deficiency with their ability to distinguish between colors have been known. For example, a spectacle lens for persons with color vision deficiency, which is described in Japanese Unexamined Patent Application Publication No. 2002-303832 (Patent Literature (PTL) 1), has a partial reflection coating on the surface of the lens. The partial reflection coating exhibits a spectral curve that indicates a monotonous increase or decrease of transmittance in a wavelength range corresponding to a color that is difficult to discern.

SUMMARY

A problem with the aforementioned conventional spectacle lens, however, is that a surface reflectance is high.

In view of this, the present disclosure has an object to provide a color vision correction filter and an optical component each having a surface reflectance lower than that conventionally attained.

In order to achieve the above object, a color vision correction filter according to one aspect of the present disclosure includes at least one type of dye material. The lowest value of transmittance of the color vision correction filter in a wavelength band ranging from 440 nm to 600 nm, inclusive, is in a range of plus or minus 50 nm of 535 nm.

An optical component according to one aspect of the present disclosure includes the above-described color vision correction filter.

According to the present disclosure, it is possible to provide a color vision correction filter and an optical component each having a surface reflectance lower than that conventionally attained.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Figure 1:
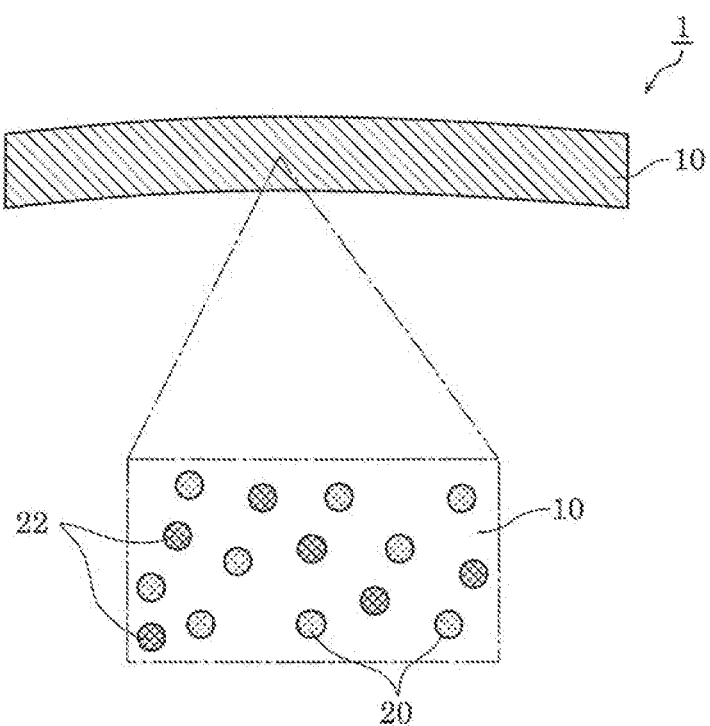
FIG. 1 is a cross-sectional schematic view illustrating a color vision correction filter according to an embodiment.

The following describes in detail a color vision correction filter and an optical component according to an embodiment of the present disclosure. Note that the embodiment described below is one example of the present disclosure. Accordingly, the numerical values, shapes, materials, elements, the arrangement and connection of the elements, steps, an order of the steps, etc. described in the following are all mere examples, and the present disclosure is not limited to these examples. Among elements in the following embodiment, those not recited in any one of independent claims are described as optional elements.

The respective drawings are schematic diagrams and are not necessarily precise illustrations. Therefore, the scale sizes in the drawings, for example, are not necessarily the same. In the respective drawings, substantially identical components are assigned the same reference signs, and overlapping description is omitted or simplified.

EMBODIMENT

[Color Vision Correction Filter]

First, a structure of a color vision correction filter according to an embodiment will be described with reference to FIG. 1. FIG. 1 is a cross-sectional schematic view illustrating color vision correction filter 1 according to the embodiment.

As illustrated in FIG. 1, color vision correction filter 1 includes base material 10 that contains one or more types of dye materials. FIG. 1 schematically illustrates an enlarged part of a cross section of base material 10 in a rectangular frame enclosed by a dashed line. In the example illustrated in FIG. 1, two types of dye materials 20 and 22 are contained in base material 10.

Base material 10 is a plate-like, light-transmissive component. As such, in some embodiments, base material 10 includes main surfaces separated from one another in a thickness direction. The thickness direction of base material 10 is the direction extending between the main surfaces of base material 10. Base material 10 is formed by molding a transparent resin material into a predetermined shape. Base material 10 is made, for example, of a polycarbonate-based, cycloolefin-based, or acrylic (PMMA) resin. Note that base material 10 may be made of a transparent glass material.

The thickness of base material 10 is, for example, at least 1 mm and at most 3 mm. A radius of curvature of base material 10 is at least 60 mm and at most 800 mm. Alternatively, the radius of curvature of base material 10 may be at least 100 mm and at most 300 mm. In such a case, base material 10 may have a convex surface and a concave surface that have different curvatures. For example, a curvature of the convex surface may be less than that of the concave surface. The convex and concave surfaces are, for example, spherical, but they may not be completely spherical. For example, a roundness of the convex and concave surfaces may be at least several micrometers and at most a dozen micrometers in a cross-sectional view of base material 10.

Base material 10 may have a function to collect or diffuse light, such that realized by a convex or concave lens. The size and shape of base material 10 match, for example, those of a spectacle or contact lens wearable by a person.

The size and shape of base material 10, however, are not limited to these. The thickness of base material 10 may be, for example, less than 1 mm or greater than 3 mm. The thickness of base material 10 may be different depending on a portion of base material 10. In other words, base material 10 may have both a thin portion and a thick portion. Alternatively, base material 10 may be a flat plate whose thickness is even.

Dye materials 20 and 22 each are evenly dispersed in at least a portion of base material 10 when seen in a plan view. For example, dye materials 20 and 22 may be evenly dispersed throughout the entirety of base material 10 when seen in a plan view. Alternatively, dye materials 20 and 22 may be dispersed only in a portion of base material 10 when seen in a plan view. For example, dye materials 20 and 22 may only be dispersed in the center of base material 10 when seen in a plan view. Dye materials 20 and 22 each are also evenly dispersed over at least a portion of base material 10 in a thickness direction of base material 10. For example, dye materials 20 and 22 may be evenly dispersed throughout the entire thickness of base material 10 in the thickness direction. FIG. 1 is a schematic view of color vision correction filter 1, and dye materials 20 and 22 are dispersed in a molecular state throughout base material 10 while being atomized to form aggregate particles. Alternatively, dye materials 20 and 22 may be evenly dispersed only in a portion of the thickness of base material 10 in the thickness direction, and this portion may include one of the main surfaces of base material 10. The main surface of base material 10 is a phase that is orthogonal to the thickness direction of base material 10 and has the largest area, for example.

A total concentration of one or more types of dye materials 20 and 22 contained in base material 10 is, for example, at least 20 ppm and at most 850 ppm, but is not limited to such. The total concentration may be lower than 20 ppm or higher than 850 ppm, and may be adjusted according to the thickness of base material 10, for example. For example, the concentration is defined to be inversely proportional to the thickness of base material 10. When the thickness of base material 10 is doubled to 2 mm, for example, the concentration of each of dye materials 20 and 22 may become half of the concentration of that dye material 20 or 22 when the thickness of base material 10 is 1 mm, Dye materials 20 and 22 may be light-absorbing materials.

Specifically, dye materials 20 and 22 each absorb light having a predetermined wavelength component. Each of dye materials 20 and 22 has an absorbance of, for example, at least 90 and at most 310. A basic skeleton of dye material 20 or 22 is, for example, of merocyanine expressed by general formula (1) below. Alternatively, the basic skeleton of dye material 20 or 22 may be of tetraazaporphyrin expressed by general formula (2) below or of phthalocyanine expressed by general formula (3) below. By appropriately adjusting these functional groups (e.g., at least one of $R_1$ through $R_8$ in general formula (2)), for example, desired spectral characteristics can be attained.

[Formula 1]

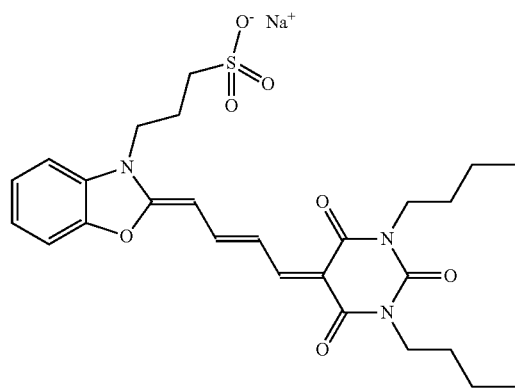

(1)

[Formula 2]

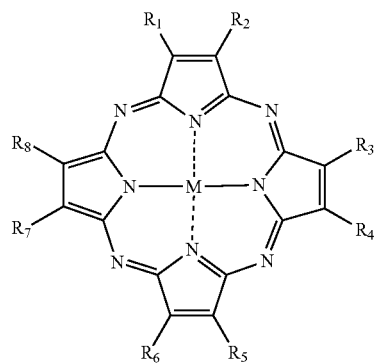

(2)

[Formula 3]

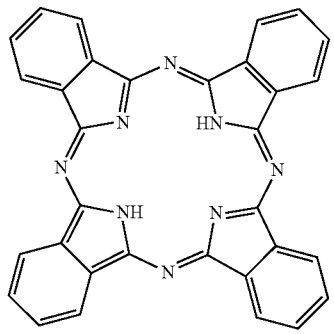

(3)

The types of dye material 20 and dye material 22 are mutually different. More specifically, dye materials 20 and 22 have spectral characteristics different from each other. Dye materials 20 and 22 each are, for example, a different one selected from dye materials C1 through C8 illustrated in FIG. 2.

In the above-described embodiment, although color vision correction filters 1 are described as two types of dye materials 20 and 22, the number of types of dye materials contained in color vision correction filter 1 is not limited to such. In some examples, the color vision correction filter 1 may contain only one type of dye material. In other examples, the color vision correction filter 1 may contain more than two types of dye materials (e.g., three, four, five, etc.).

Figure 2:
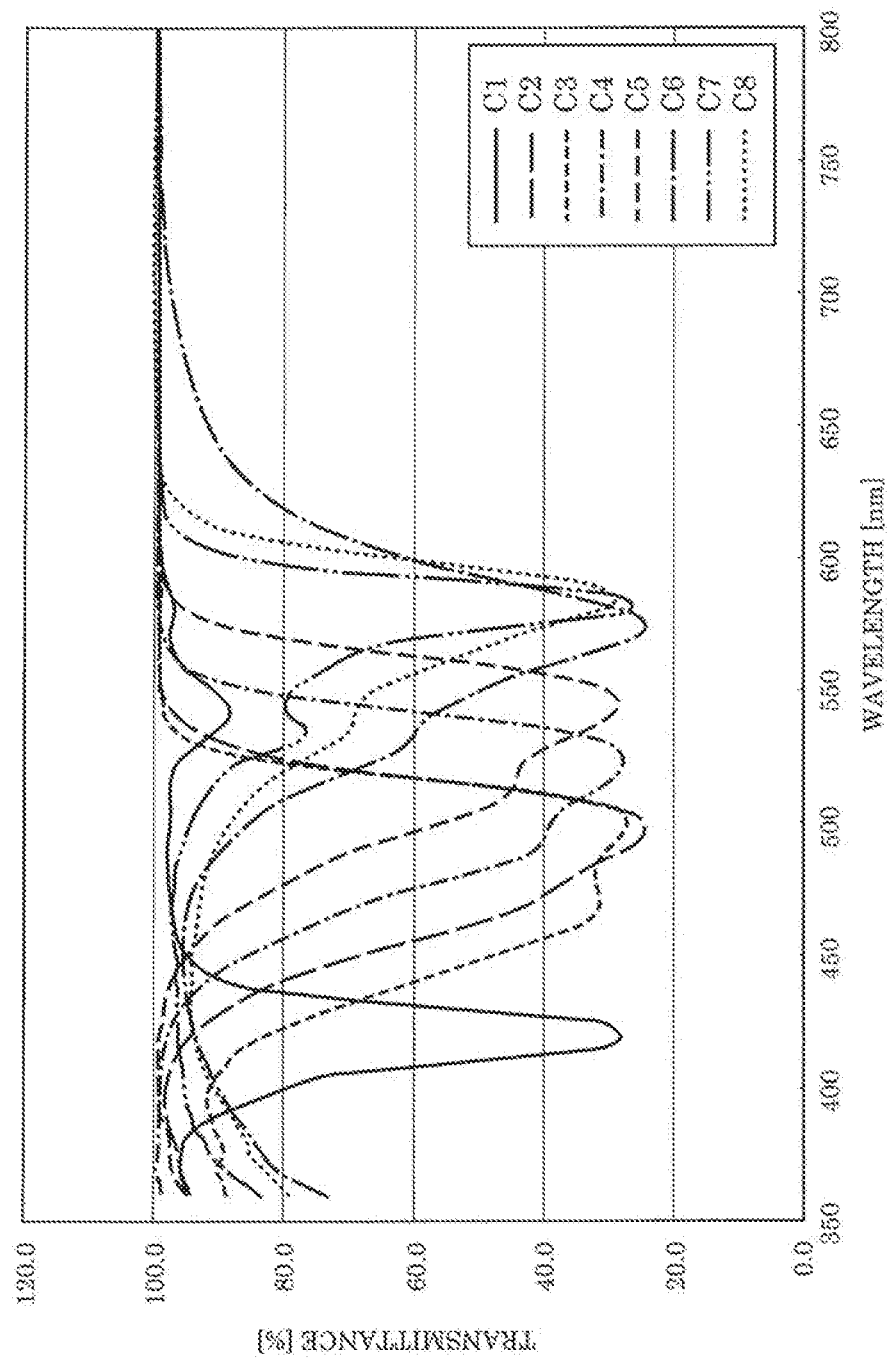
FIG. 2 is a graph that illustrates spectral properties of eight types of dye materials that may possibly be contained in the color vision correction filter according to the embodiment.

FIG. 2 is a graph that illustrates spectral characteristics of eight types of dye materials C1 through C8 that may possibly be contained in color vision correction filter 1 according to the present embodiment. In FIG. 2, the horizontal axis presents wavelength (nm) and the vertical axis presents transmittance (%). The same applies to FIG. 3 through FIG. 10 to be described later.

In FIG. 2, transmittance per wavelength of a polycarbonate base material (hereinafter referred to as a PC base material), in which each of target dye materials is evenly dispersed with a predetermined concentration, is indicated as the spectral characteristics of the dye materials. The concentration of each dye material to be contained is adjusted so that the lowest value of transmittance becomes around 25%.

As illustrated in FIG. 2, dye materials C1 through C8 each have an absorption peak in the range from 415 nm to 590 nm. Specifically, dye materials C1 through C8 each have a peak wavelength of the highest absorption peak, in a visible light band, in the range from 415 nm to 590 nm. The highest absorption peak is a peak at which transmittance becomes the lowest in the visible light band, and a peak wavelength is a wavelength at which transmittance becomes the lowest. The visible light band ranges from 380 nm to 780 nm.

Dye material C1 is one example of a dye material of the first type that has a peak of absorption in the range from 415 nm to 425 nm, and a full width at half maximum of the peak is at least 20 nm and at most 45 nm. Specifically, dye material C1 has a peak wavelength of the highest absorption peak, in the visible light band, in the range from 415 nm to 590 nm.

A full width at half maximum is equivalent to a peak width when transmittance indicates an intermediate value between the highest value (100%) and the lowest value (specifically, transmittance at a peak wavelength). For example, since the lowest value of the transmittance of dye material C1 shown in FIG. 2 is approximately 27%, a full width at half maximum is a peak width when the transmittance is approximately 64%, that is, approximately 26 nm. The lowest value of the transmittance at a peak is adjustable depending on the concentration of dye material C1 contained in base material 10. The same applies to dye materials C2 through C8.

Dye material C2 is one example of a dye material of the second type that has a peak of absorption in the range from 490 nm to 500 nm, and the full width at half maximum of the peak is at least 65 nm and at most 110 nm. Specifically, dye material C2 has a peak wavelength of the highest absorption peak, in the visible light band, in the range from 490 nm to 500 nm. For example, since the lowest value of the transmittance of dye material C2 illustrated in FIG. 2 is approximately 25%, the full width at half maximum of a peak is a peak width when the transmittance is approximately 63%, that is, approximately 65 nm.

Dye material C3 is one example of a dye material of the third type that has a peak of absorption in the range from 490 nm to 505 nm, and the full width at half maximum of the peak is at least 70 nm and at most 105 nm. Specifically, dye material C3 has a peak wavelength of the highest absorption peak, in the visible light band, in the range from 490 nm to 505 nm in the visible light band. For example, since the lowest value of the transmittance of dye material C3 illustrated in FIG. 2 is approximately 26%, the full width at half maximum of a peak is a peak width when the transmittance is approximately 63%, that is, approximately 80 nm.

Dye material C4 is one example of a dye material of the fourth type that has a peak of absorption in the range from 520 nm to 530 nm, and the full width at half maximum of the peak is at least 60 nm and at most 130 nm. Specifically, dye material C4 has a peak wavelength of the highest absorption peak, in the visible light band, in the range from 520 nm to 530 nm. For example, since the lowest value of the transmittance of dye material C4 illustrated in FIG. 2 is approximately 27%, the full width at half maximum of a peak is a peak width when the transmittance is approximately 64%, that is, approximately 71 nm.

Dye material C5 is one example of a dye material of the fifth type that has a peak of absorption in the range from 540 nm to 550 nm, and the full width at half maximum of the peak is at least 70 nm and at most 125 nm. Specifically, dye material C5 has a peak wavelength of the highest absorption peak, in the visible light band, in the range from 540 nm to 550 nm. For example, since the lowest value of the transmittance of dye material C5 illustrated in FIG. 2 is approximately 28%, the full width at half maximum of a peak is a peak width when the transmittance is approximately 64%, that is, approximately 71 nm.

Dye material C6 is one example of a dye material of the sixth type that has a peak of absorption in the range from 570 nm to 580 nm, and the full width at half maximum of the peak is at least 25 nm and at most 80 nm. Specifically, dye material C6 has a peak wavelength of the highest absorption peak, in the visible light band, in the range from 570 nm to 580 nm. For example, since the lowest value of the transmittance of dye material C6 illustrated in FIG. 2 is approximately 24%, the full width at half maximum of a peak is a peak width when the transmittance is approximately 62%, that is, approximately 72 nm.

Dye material C7 is one example of a dye material of the seventh type that has a peak of absorption in the range from 575 nm to 585 nm, and the full width at half maximum of the peak is at least 25 nm and at most 80 nm. Specifically, dye material C7 has a peak wavelength of the highest absorption peak, in the visible light band, in the range from 575 nm to 585 nm. For example, since the lowest value of the transmittance of dye material C7 illustrated in FIG. 2 is approximately 26%, the full width at half maximum of a peak is a peak width when the transmittance is approximately 63%, that is, approximately 26 nm.

Dye material C8 is one example of a dye material of the eighth type that has a peak of absorption in the range from 580 nm to 590 nm, and the full width at half maximum of the peak is at least 45 nm and at most 120 nm. Specifically, dye material C8 has a peak wavelength of the highest absorption peak, in the visible light band, in the range from 580 nm to 590 nm. For example, since the lowest value of the transmittance of dye material C8 illustrated in FIG. 2 is approximately 29%, the full width at half maximum of a peak is a peak width when the transmittance is approximately 65%, that is, approximately 52 nm.

Color vision correction filter 1 illustrated in FIG. 1 contains one or more types of dye materials selected from the eight types of dye materials C1 through C8 described above. Each of one or more types of dye materials is contained in color vision correction filter 1 in a predetermined proportion to a resin material constituting base material 10.

In the present embodiment, the lowest value of the transmittance of color vision correction filter 1 in the wavelength band ranging from 440 nm to 600 nm is in the range of plus or minus 50 nm of 535 nm (i.e., in the range from 485 nm to 585 nm). More specifically, the lowest value of the transmittance of color vision correction filter 1 in the wavelength band ranging from 440 nm to 600 nm is in the range of plus or minus 30 nm of 535 nm (i.e., in the range from 505 nm to 565 nm).

A bandwidth of a peak that includes the lowest value is at least 30 nm and at most 115 nm for a predetermined value in the range in which the transmittance of color vision correction filter 1 is at least 40% and at most 60%. Alternatively, a bandwidth of a peak that includes the lowest value is at least 120 nm and at most 175 nm for a predetermined value in the range in which the transmittance of color vision correction filter 1 is at least 10% and at most 30%.

In the present embodiment, the reflectance of color vision correction filter 1 is at most 15%. Specifically, reflectance for the wavelength of 535 nm is at most 15%. The reflectance of color correction filter 1 may be at most 15% in the entire visible light band.

In the present embodiment, by containing dye materials in base material 10, color vision correction filter 1 achieves a desired spectrum. In other words, since a partial reflection coating is not provided on the surface of base material 10, it is possible to sufficiently decrease reflectance at the surface.

The following describes examples of color vision correction filter 1. Color vision correction filter 1 according to each of the examples is capable of correcting the color visions of individuals having color vision deficiency. Color vision correction filters 1 according to the examples have spectral characteristics different from one another depending on the type and severity of color vision deficiency.

Example 1

First, Example 1 will be described.

Figure 3:
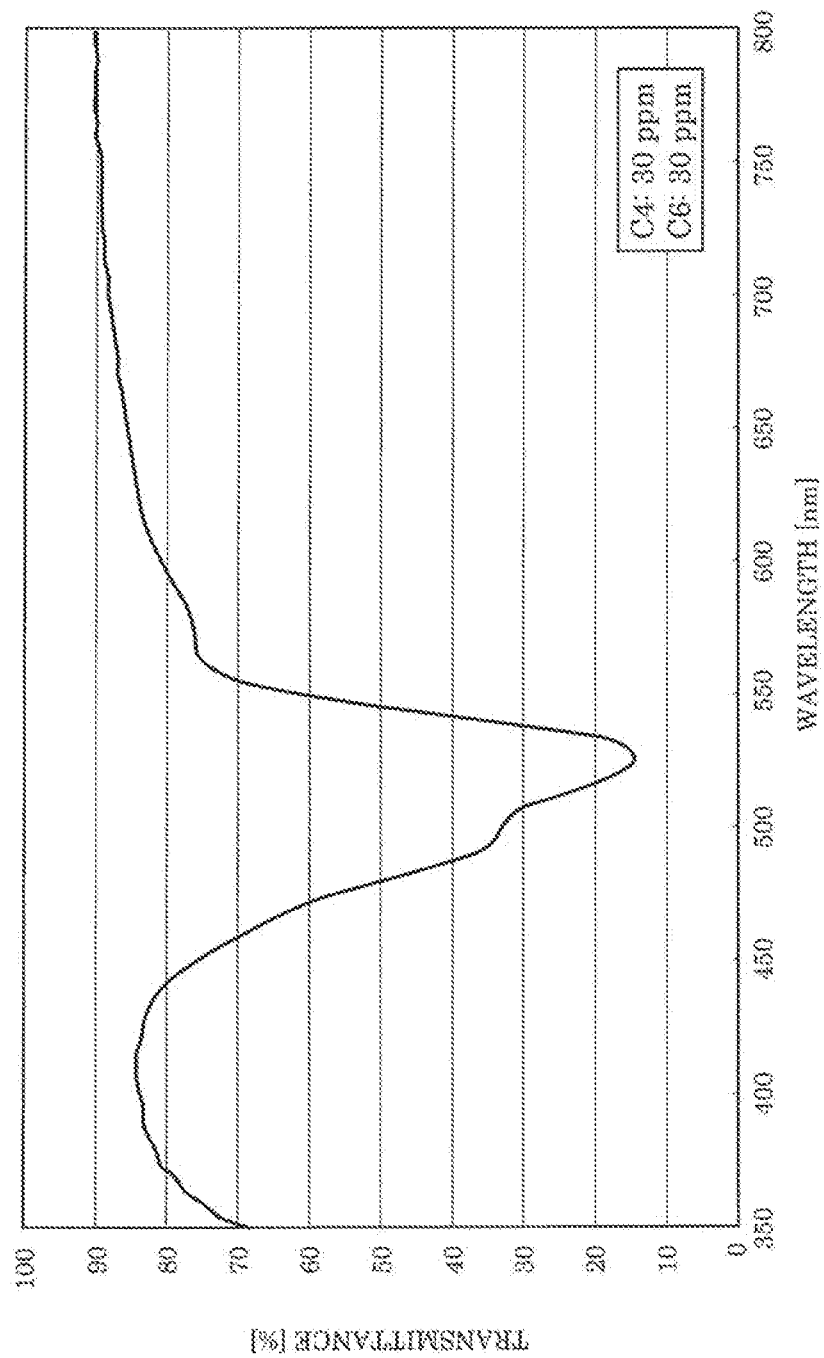
FIG. 3 is a graph that illustrates spectral properties of a color vision correction filter according to Example 1.

FIG. 3 is a graph that illustrates spectral characteristics of a color vision correction filter according to Example 1. The color vision correction filter according to Example 1 contains two types of dye materials C4 and C6.

As illustrated in FIG. 3, the color vision correction filter according to Example 1 has a peak wavelength of approximately 525 nm. Transmittance of the color vision correction filter at the peak wavelength is approximately 15% which is the lowest value in the wavelength band ranging from 440 nm to 600 nm. When the transmittance is 40%, a bandwidth of a peak is approximately 55 nm. When the transmittance is 60%, the bandwidth of the peak is approximately 79 nm. The color vision correction filter according to Example 1 has the peak bandwidth in the range from about 55 nm to about 79 nm in the range in which the transmittance is at least 40% and at most 60%.

Polycarbonate was used as a resin material constituting base material 10 of the color vision correction filter according to Example 1. Specifically, dye material C4 and dye material C6 are mixed with the same concentration, that is, 30 ppm. Note that the concentration of each of the dye materials here is equivalent to a design value when the thickness of base material 10 is defined as 1 mm. For example, the concentration is defined to be inversely proportional to the thickness of base material 10. When the thickness of base material 10 is doubled to 2 mm, for example, the concentration of each of dye materials C4 and C6 becomes half, that is, 15 ppm. In this case, transmittance is determined according to the Lambert-Beer law.

Figure 4:
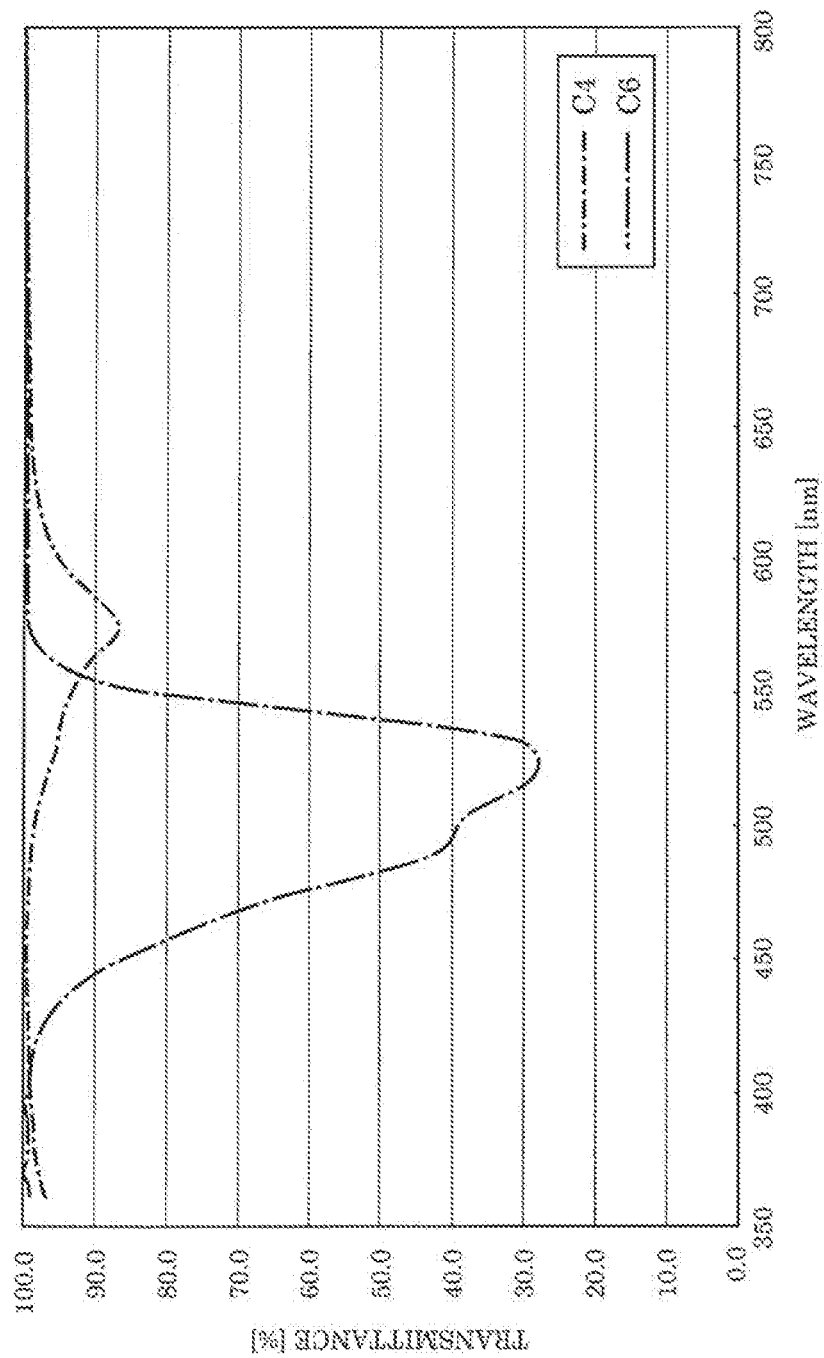
FIG. 4 is a graph that illustrates spectral properties of two types of dye materials contained in the color vision correction filter according to Example 1.

FIG. 4 is a graph that illustrates spectral characteristics of two types of dye materials C4 and C6 contained in the color vision correction filter according to Example 1. FIG. 4 illustrates transmittance per wavelength (i.e., spectral characteristics) of PC base materials that respectively contain only a corresponding one of the aforementioned dye materials in the same amount as that contained in the color vision correction filter according to Example 1. Specifically, FIG. 4 illustrates spectral characteristics of a PC base material in which dye material C4 is evenly dispersed with the concentration of 30 ppm, and spectral characteristics of a PC base material in which dye material C6 is evenly dispersed with the concentration of 30 ppm.

As illustrated in FIG. 4, with the color vision correction filter according to Example 1, the transmittance of dye material C4 becomes the lowest at the wavelength of approximately 525 nm, and the lowest value is approximately 28%. The full width at half maximum of a peak that includes the lowest value is approximately 72 nm.

With the color vision correction filter according to Example 1, the transmittance of dye material C6 becomes the lowest at the wavelength of approximately 580 nm, and the lowest value is approximately 87%. The full width at half maximum of a peak that includes the lowest value is approximately 48 nm.

As can be seen in the comparison between FIG. 2 and FIG. 4, dye materials of the same type and of different concentrations have the same peak wavelength. The lowest value at a peak varies depending on the concentration of a dye material. In other words, it is possible to realize desired spectral characteristics by adjusting the types and concentrations of the dye materials to be contained in a PC base material.

Example 2

Next, Example 2 will be described.

Figure 5:
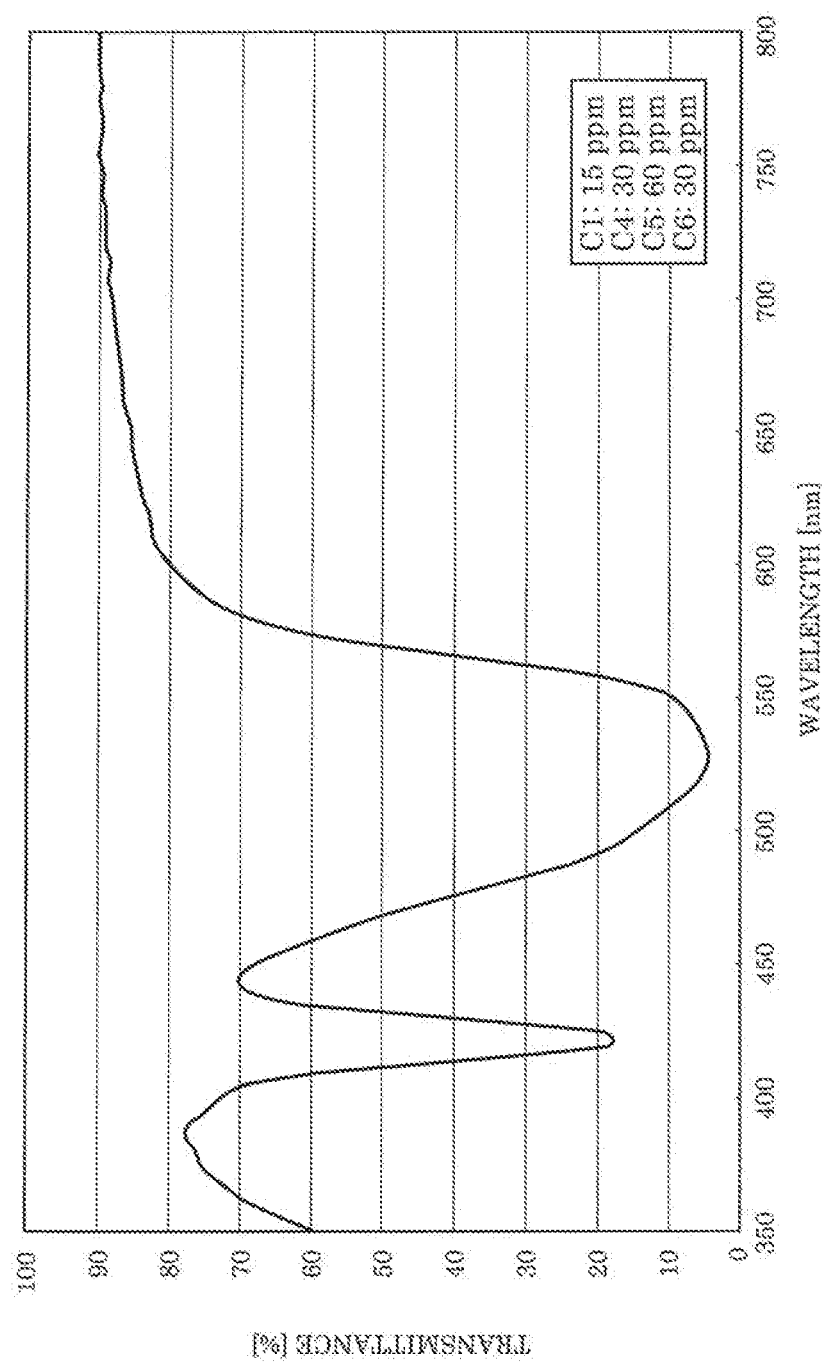
FIG. 5 is a graph that illustrates spectral properties of a color vision correction filter according to Example 2.

FIG. 5 is a graph that illustrates spectral characteristics of a color vision correction filter according to Example 2. The color vision correction filter according to Example 2 contains four types of dye materials C1, C4, C5, and C6.

As illustrated in FIG. 5, the color vision correction filter according to Example 2 has a peak wavelength of approximately 528 nm. Transmittance of the color vision correction filter at the peak wavelength is approximately 5% which is the lowest value in the wavelength band ranging from 440 nm to 600 nm. When the transmittance is 40%, a bandwidth of a peak is approximately 91 nm. When the transmittance is 60%, the bandwidth of the peak is approximately 115 nm. The color vision correction filter according to Example 2 has the peak bandwidth in the range from about 91 nm to about 115 nm in the range in which the transmittance of the color vision correction filter is at least 40% and at most 60%.

Polycarbonate was used as a resin material constituting base material 10 of the color vision correction filter according to Example 2. Specifically, dye materials C1, C4, C5, and C6 are mixed in the proportion of approximately 1:2:4:2. To be more specific, the concentrations of dye materials C1, C4, C5, and C6 were 15 ppm, 30 ppm, 60 ppm, and 30 ppm, respectively.

Figure 6:
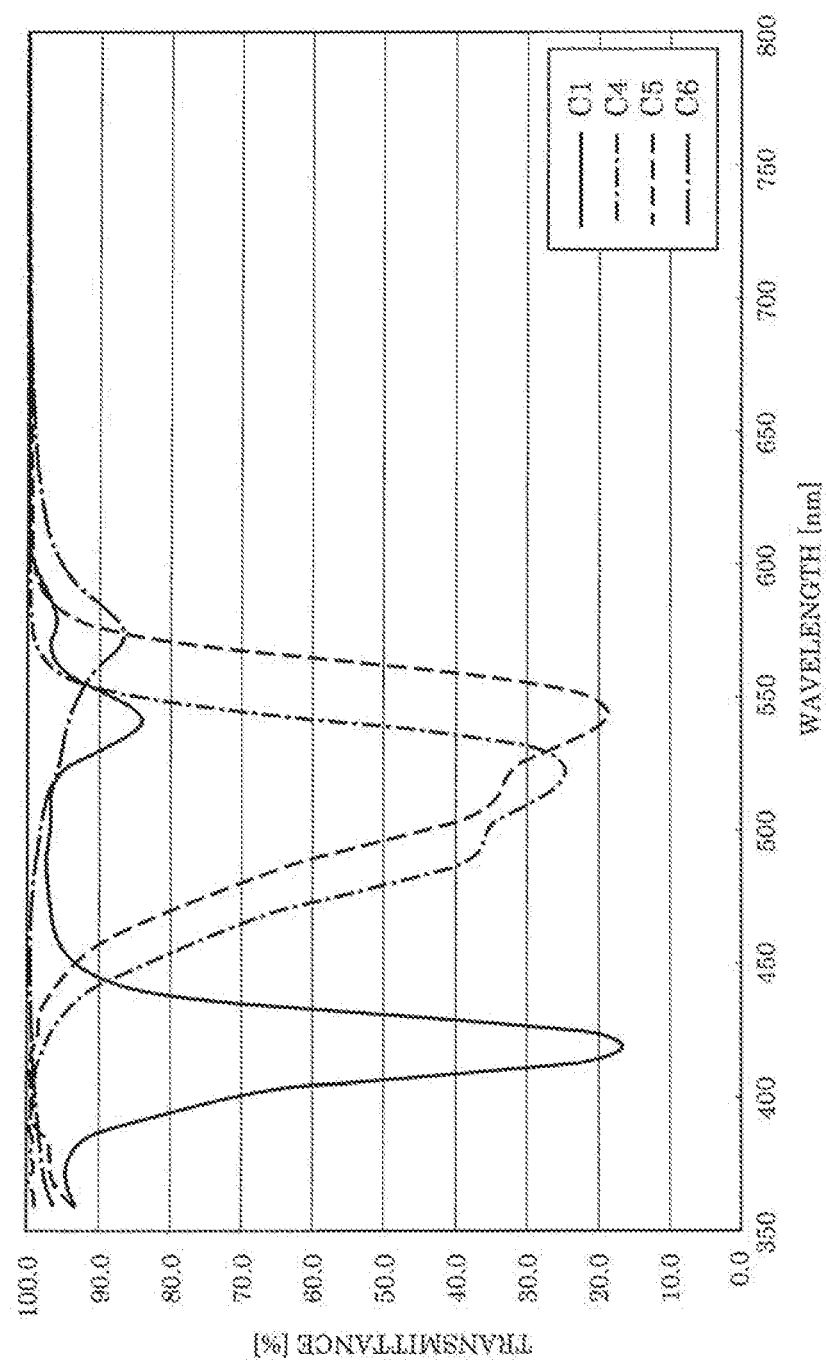
FIG. 6 is a graph that illustrates spectral properties of four types of dye materials contained in the color vision correction filter according to Example 2.

FIG. 6 is a graph that illustrates spectral characteristics of four types of dye materials C1, C4, C5, and C6 contained in the color vision correction filter according to Example 2. FIG. 6 illustrates transmittance per wavelength (i.e., spectral characteristics) of PC base materials that respectively contain only a corresponding one of the aforementioned dye materials in the same amount as that contained in the color vision correction filter according to Example 2. Specifically, FIG. 6 illustrates: spectral characteristics of a PC base material in which dye material C1 is evenly dispersed with the concentration of 15 ppm; spectral characteristics of a PC base material in which dye material C4 is evenly dispersed with the concentration of 30 ppm; spectral characteristics of a PC base material in which dye material C5 is evenly dispersed with the concentration of 60 ppm; and spectral characteristics of a PC base material in which dye material C6 is evenly dispersed with the concentration of 30 ppm.

As illustrated in FIG. 6, with the color vision correction filter according to Example 2, the transmittance of dye material C1 becomes the lowest at the wavelength of approximately 420 nm, and the lowest value is approximately 17%. The full width at half maximum of a peak that includes the lowest value is approximately 24 nm.

With the color vision correction filter according to Example 2, the transmittance of dye material C4 becomes the lowest at the wavelength of approximately 525 nm, and the lowest value is approximately 25%. The full width at half maximum of a peak that includes the lowest value is approximately 70 nm.

With the color vision correction filter according to Example 2, the transmittance of dye material C5 becomes the lowest at the wavelength of approximately 545 nm, and the lowest value is approximately 19%. The full width at half maximum of a peak that includes the lowest value is approximately 75 nm.

With the color vision correction filter according to Example 2, the transmittance of dye material C6 becomes the lowest at the wavelength of approximately 575 nm, and the lowest value is approximately 87%. The full width at half maximum of a peak that includes the lowest value is approximately 45 nm.

Example 3

Next, Example 3 will be described.

Figure 7:
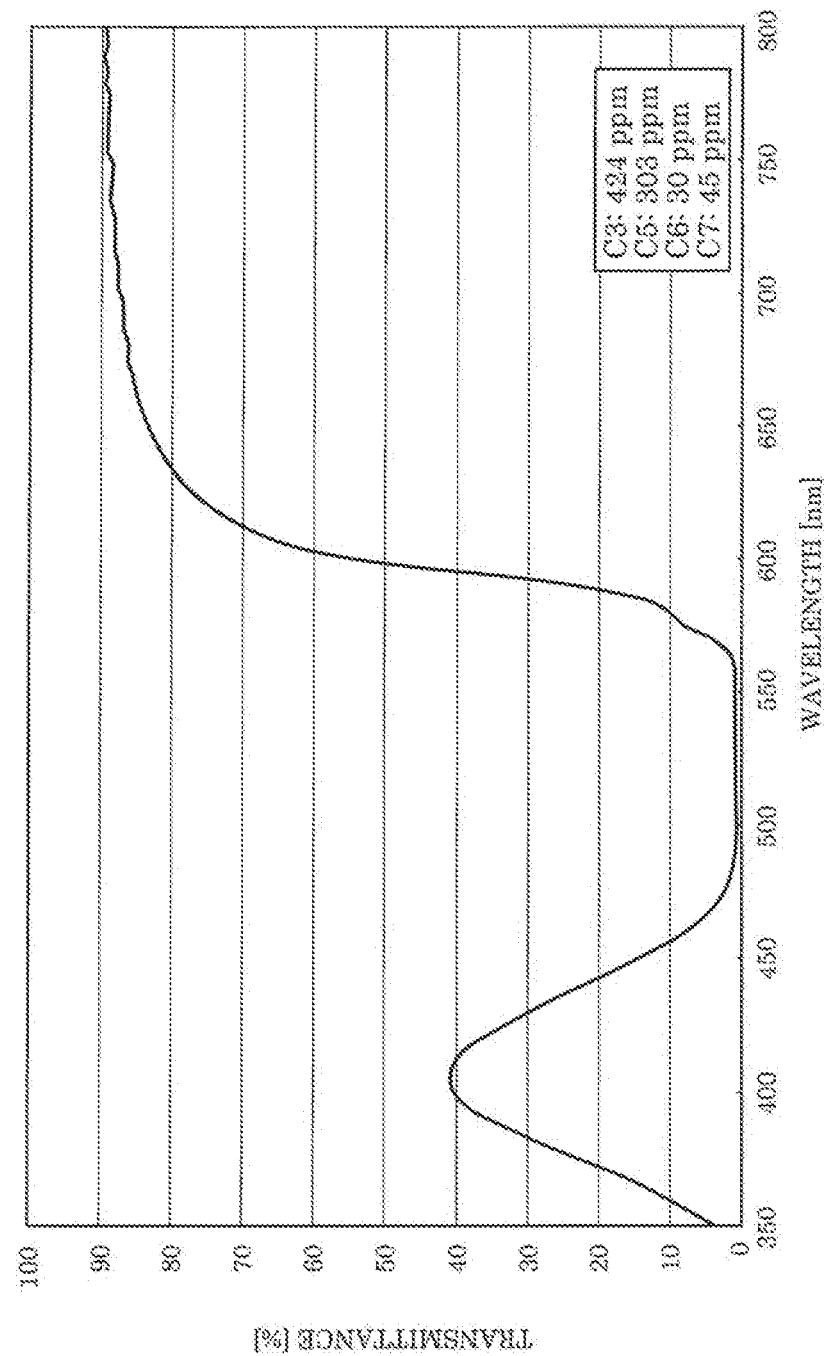
FIG. 7 is a graph that illustrates spectral properties of a color vision correction filter according to Example 3.

FIG. 7 is a graph that illustrates spectral characteristics of a color vision correction filter according to Example 3. The color vision correction filter according to Example 3 contains four types of dye materials C3, C5, C6, and C7.

As illustrated in FIG. 7, the color vision correction filter according to Example 3 has a peak wavelength in the range from 480 nm to 510 nm. Transmittance of the color vision correction filter at the peak wavelength is approximately 1% which is the lowest value in the wavelength band ranging from 440 nm to 600 nm. When transmittance is 10%, a bandwidth of a peak is approximately 124 nm. When transmittance is 30%, the bandwidth of the peak is approximately 164 nm. The color vision correction filter according to Example 3 has the peak bandwidth in the range from about 124 nm to about 164 nm in the range in which the transmittance is at least 10% and at most 30%.

Polycarbonate was used as a resin material constituting base material 10 of the color vision correction filter according to Example 3. Specifically, dye materials C3, C5, C6, and C7 are mixed in the proportion of approximately 28:20:2:3. To be more specific, the concentrations of dye materials C3, C5, C6, and C7 were 424 ppm, 303 ppm, 30 ppm, and 45 ppm, respectively.

Figure 8:
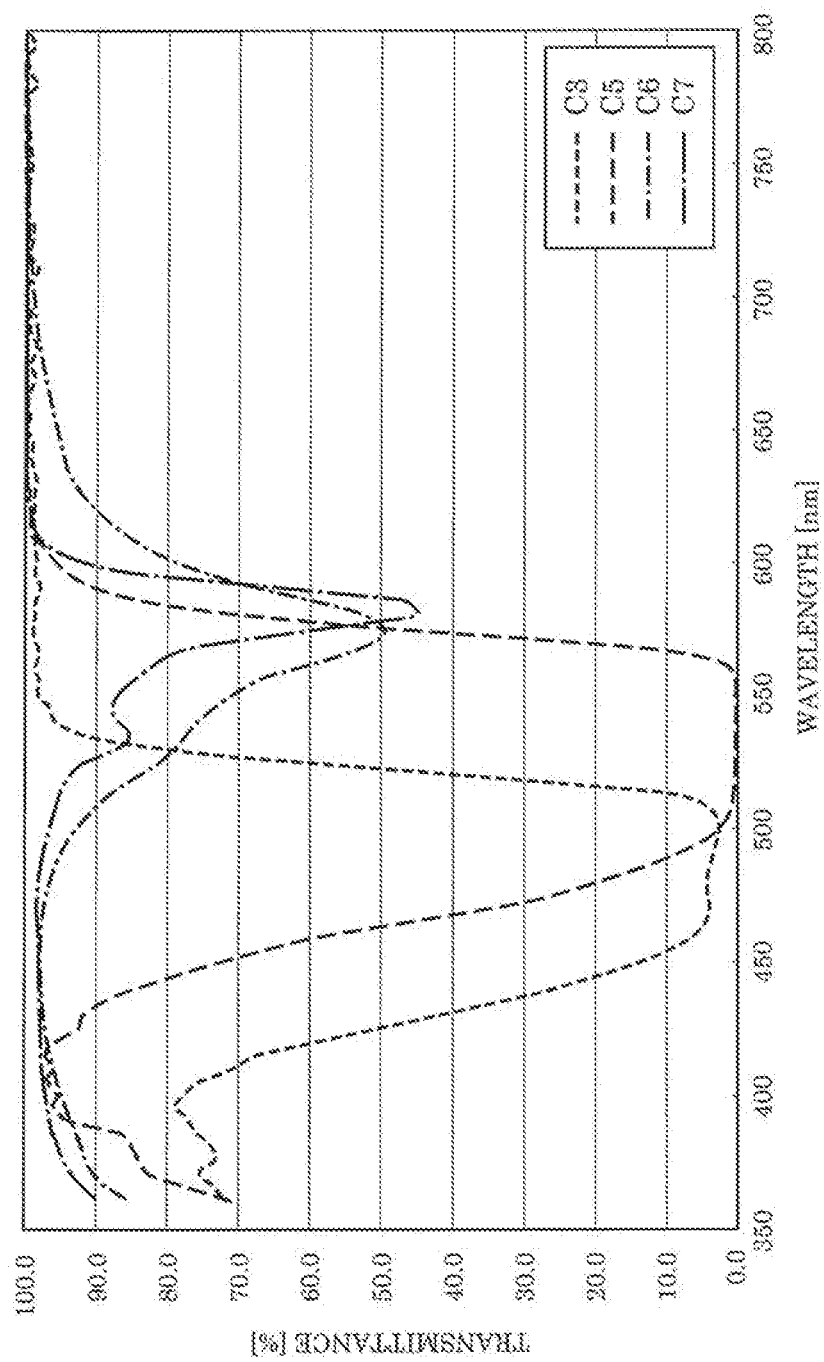
FIG. 8 is a graph that illustrates spectral properties of four types of dye materials contained in the color vision correction filter according to Example 3.

FIG. 8 is a graph that illustrates spectral characteristics of four types of dye materials C3, C5, C6, and C7 contained in the color vision correction filter according to Example 3. FIG. 8 illustrates transmittance per wavelength (i.e., spectral characteristics) of PC base materials that respectively contain only a corresponding one of the aforementioned dye materials in the same amount as that contained in the color vision correction filter according to Example 3. Specifically, FIG. 8 illustrates: spectral characteristics of a PC base material in which dye material C3 is evenly dispersed with the concentration of 424 ppm; spectral characteristics of a PC base material in which dye material C5 is evenly dispersed with the concentration of 303 ppm; spectral characteristics of a PC base material in which dye material C6 is evenly dispersed with the concentration of 30 ppm; and spectral characteristics of a PC base material in which dye material C7 is evenly dispersed with the concentration of 45 ppm.

As illustrated in FIG. 8, with the color vision correction filter according to Example 3, the transmittance of dye material C3 becomes the lowest at the wavelength of approximately 500 nm, and the lowest value is approximately 3%. The full width at half maximum of a peak that includes the lowest value is approximately 98 nm.

With the color vision correction filter according to Example 3, the transmittance of dye material C5 becomes the lowest at the wavelength of approximately 545 nm, and the lowest value is approximately 0%. The full width at half maximum of a peak that includes the lowest value is approximately 112 nm.

With the color vision correction filter according to Example 3, the transmittance of dye material C6 becomes the lowest at the wavelength of approximately 575 nm, and the lowest value is approximately 49%. The full width at half maximum of a peak that includes the lowest value is approximately 55 nm.

With the color vision correction filter according to Example 3, the transmittance of dye material C7 becomes the lowest at the wavelength of approximately 580 nm, and the lowest value is approximately 45%. The full width at half maximum of a peak that includes the lowest value is approximately 25 nm.

Example 4

Next, Example 4 will be described.

Figure 9:
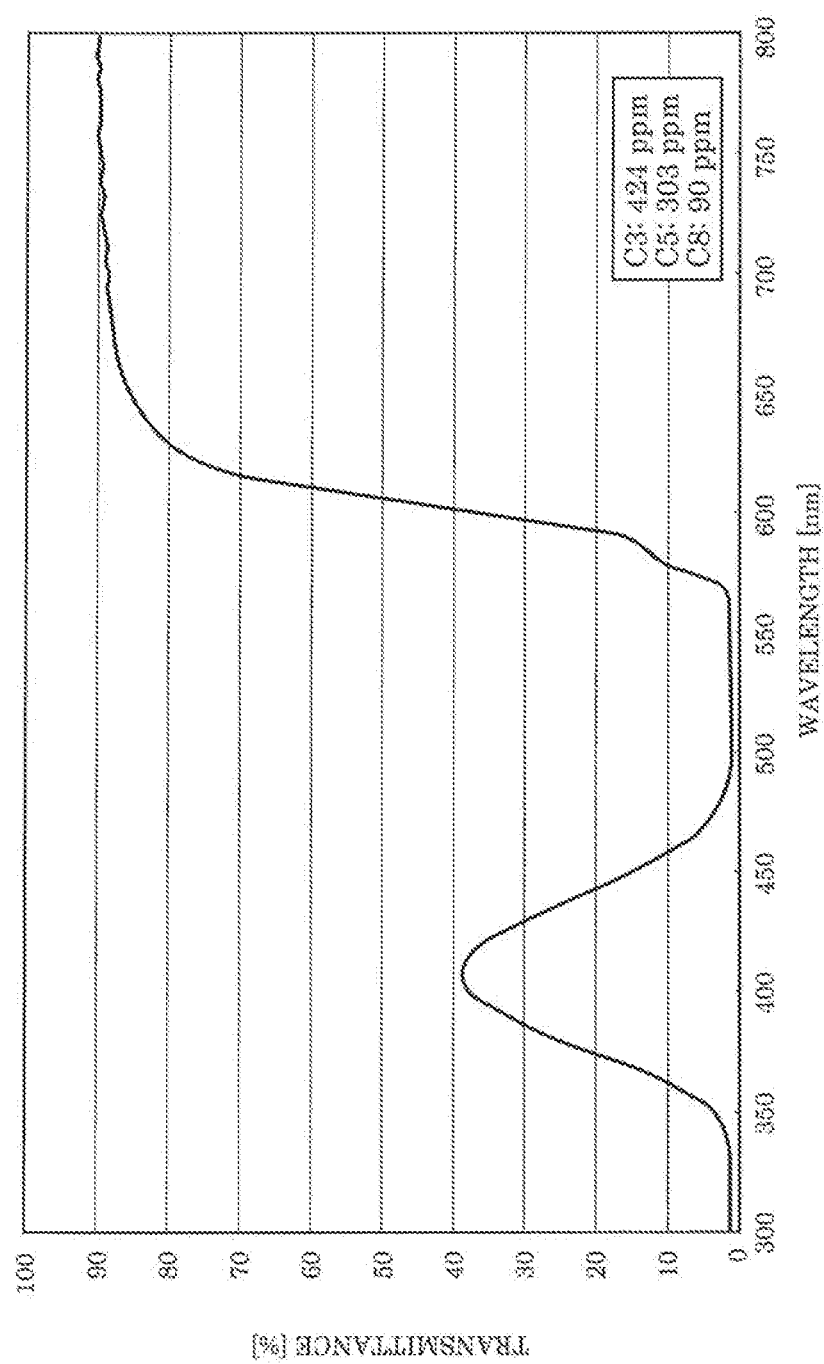
FIG. 9 is a graph that illustrates spectral properties of a color vision correction filter according to Example 4.

FIG. 9 is a graph that illustrates spectral characteristics of a color vision correction filter according to Example 4. The color vision correction filter according to Example 4 contains three types of dye materials C3, C5, and C8.

As illustrated in FIG. 9, the color vision correction filter according to Example 4 has a peak wavelength in the range from 480 nm to 510 nm. Transmittance of the color vision correction filter at the peak wavelength is approximately 1% which is the lowest value in the wavelength band ranging from 440 nm to 600 nm. When transmittance is 10%, a bandwidth of a peak is approximately 108 nm. When transmittance is 30%, the bandwidth of the peak is approximately 150 nm. The color vision correction filter according to Example 4 has the peak bandwidth in the range from 108 nm to 150 nm in the range in which the transmittance is at least 10% and at most 30%.

Polycarbonate was used as a resin material constituting base material 10 of the color vision correction filter according to Example 4. Specifically, dye materials C3, C5, and C8 are mixed in the proportion of approximately 14:10:3. To be more specific, the concentrations of dye materials C3, C5, and C8 were 424 ppm, 303 ppm, and 90 ppm, respectively.

Figure 10:
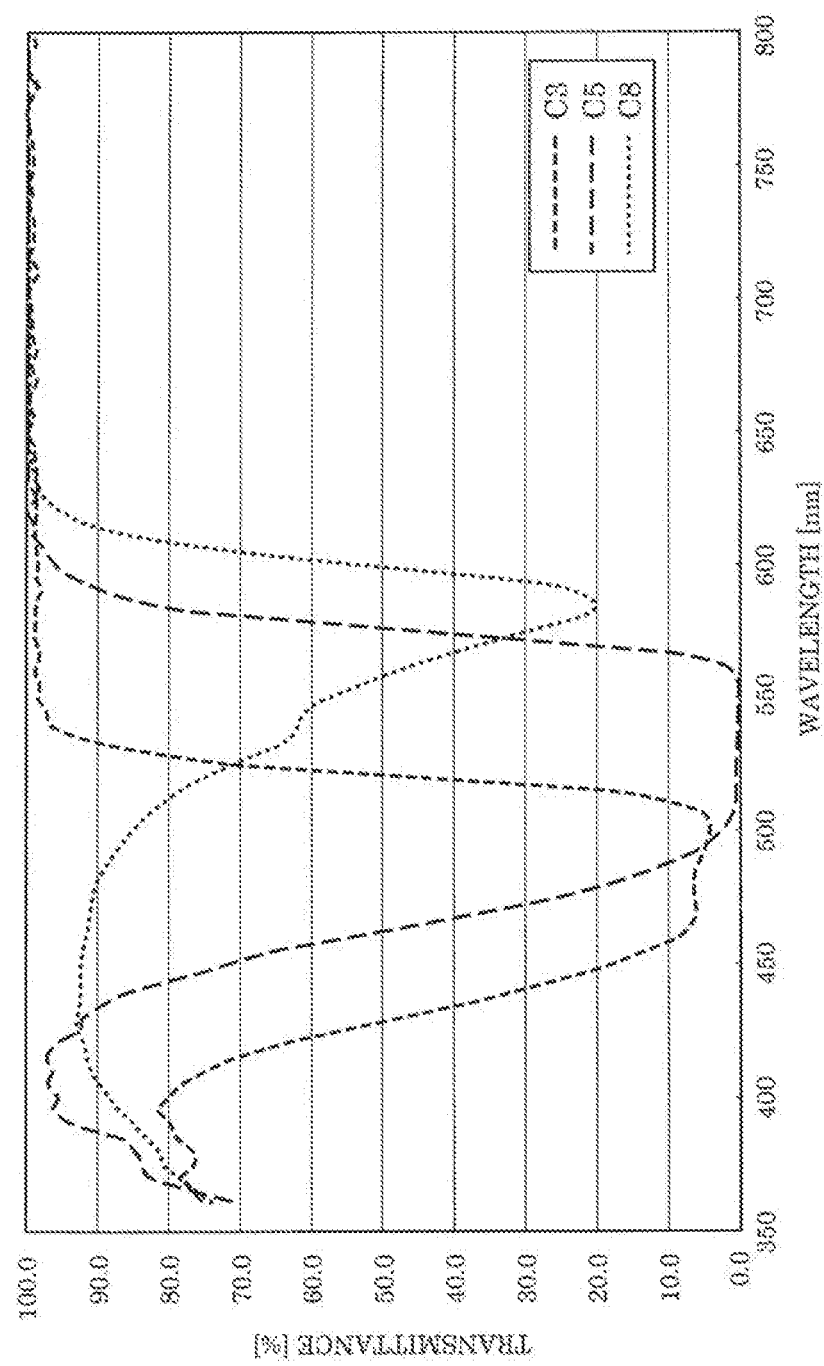
FIG. 10 is a graph that illustrates spectral properties of three types of dye materials contained in the color vision correction filter according to Example 4.

FIG. 10 is a graph that illustrates spectral characteristics of three types of dye materials C3, C5, and C8 contained in the color vision correction filter according to Example 4. FIG. 10 illustrates transmittance per wavelength (i.e., spectral characteristics) of PC base materials that respectively contain only a corresponding one of the aforementioned dye materials in the same amount as that contained in the color vision correction filter according to Example 4. Specifically, FIG. 10 illustrates: spectral characteristics of a PC base material in which dye material C3 is evenly dispersed with the concentration of 424 ppm; spectral characteristics of a PC base material in which dye material C5 is evenly dispersed with the concentration of 303 ppm; spectral characteristics of a PC base material in which dye material C8 is evenly dispersed with the concentration of 90 ppm.

As illustrated in FIG. 10, with the color vision correction filter according to Example 4, the transmittance of dye material C3 becomes the lowest at the wavelength of approximately 500 nm, and the lowest value is approximately 5%. The full width at half maximum of a peak that includes the lowest value is approximately 95 nm.

With the color vision correction filter according to Example 4, the transmittance of dye material C5 becomes the lowest at the wavelength of approximately 545 nm, and the lowest value is approximately 0%. The full width at half maximum of a peak that includes the lowest value is approximately 112 nm.

With the color vision correction filter according to Example 4, the transmittance of dye material C8 becomes the lowest at the wavelength of approximately 585 nm, and the lowest value is approximately 20%. The full width at half maximum of a peak that includes the lowest value is approximately 56 nm.

Example 5

Next, Example 5 will be described.

Figure 11:
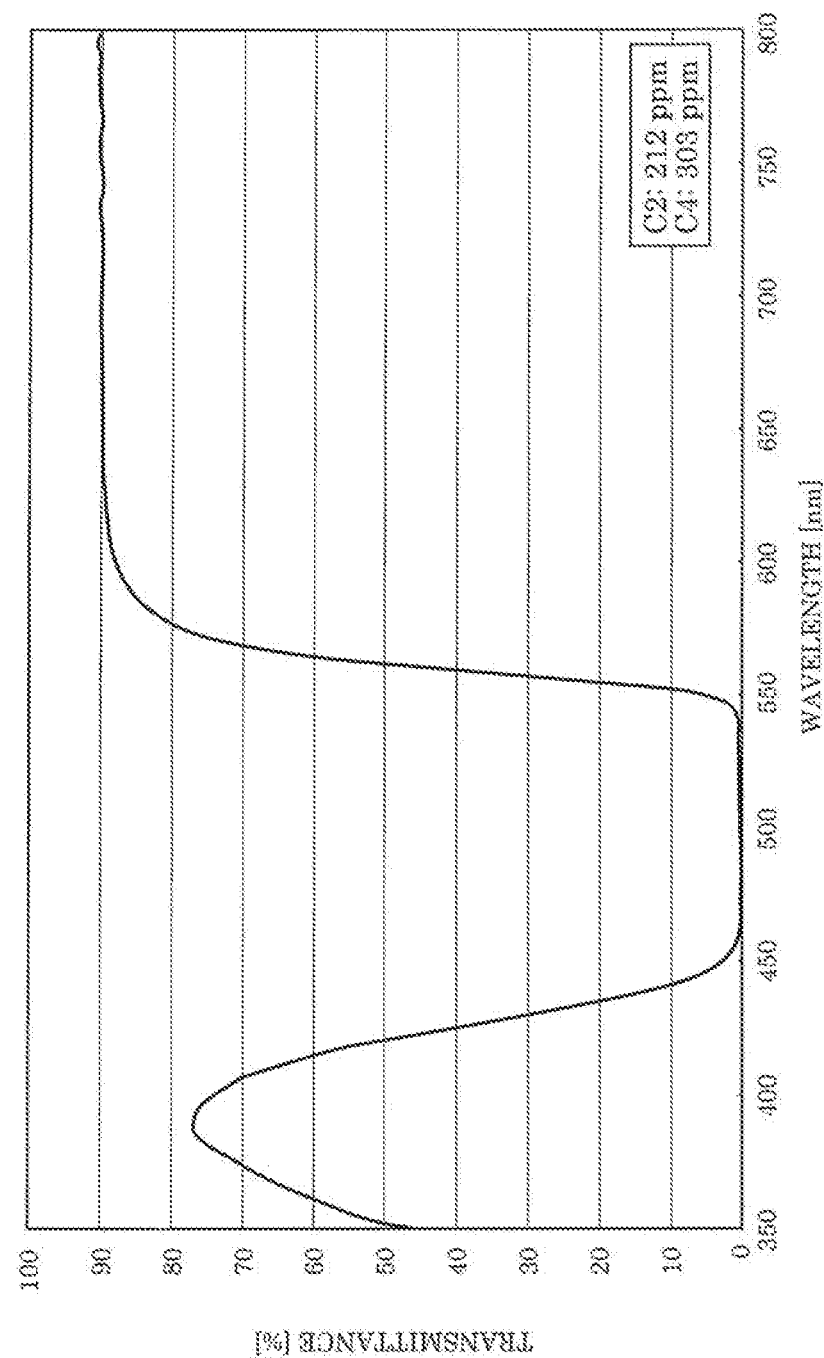
FIG. 11 is a graph that illustrates spectral properties of a color vision correction filter according to Example 5.

FIG. 11 is a graph that illustrates spectral characteristics of a color vision correction filter according to Example 5. The color vision correction filter according to Example 5 contains two types of dye materials C2 and C4.

As illustrated in FIG. 11, the color vision correction filter according to Example 5 has a peak wavelength in the range from 460 nm to 540 nm. Transmittance of the color vision correction filter at the peak wavelength is approximately 0% which is the lowest value in the wavelength band ranging from 440 nm to 600 nm. When transmittance is 10%, a bandwidth of a peak is approximately 112 nm. When transmittance is 30%, the bandwidth of the peak is approximately 129 nm. The color vision correction filter according to Example 5 has the peak bandwidth in the range from about 112 nm to about 129 nm in the range in which the transmittance is at least 10% and at most 30%.

Polycarbonate was used as a resin material constituting base material 10 of the color vision correction filter according to Example 5. Specifically, dye materials C2 and C4 are mixed in the proportion of approximately 7:10. To be more specific, the concentrations of dye materials C2 and C4 were 212 ppm and 303 ppm, respectively.

Figure 12:
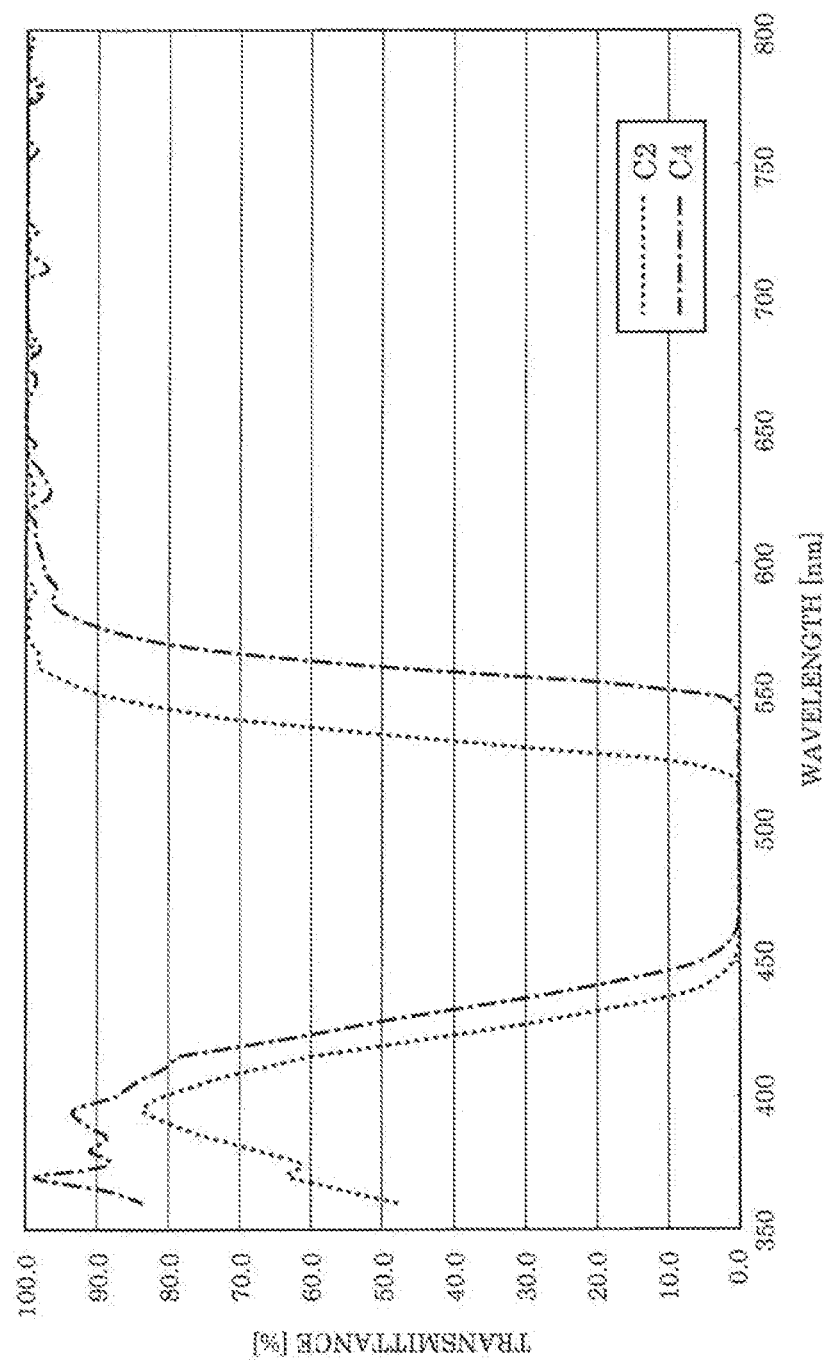
FIG. 12 is a graph that illustrates spectral properties of two types of dye materials contained in the color vision correction filter according to Example 5.

FIG. 12 is a graph that illustrates spectral characteristics of two types of dye materials C2 and C4 contained in the color vision correction filter according to Example 5. FIG. 12 illustrates transmittance per wavelength (i.e., spectral characteristics) of PC base materials that respectively contain only a corresponding one of the aforementioned dye materials in the same amount as that contained in the color vision correction filter according to Example 5. Specifically, FIG. 12 illustrates: spectral characteristics of a PC base material in which dye material C2 is evenly dispersed with the concentration of 212 ppm; and spectral characteristics of a PC base material in which dye material C4 is evenly dispersed with the concentration of 303 ppm.

As illustrated in FIG. 12, with the color vision correction filter according to Example 5, the transmittance of dye material C2 becomes the lowest at the wavelength in the range from 460 nm to 520 nm, and the lowest value is approximately 0%. The full width at half maximum of a peak that includes the lowest value is approximately 118 nm.

With the color vision correction filter according to Example 5, the transmittance of dye material C4 becomes the lowest at the wavelength in the range from 470 nm to 570 nm, and the lowest value is approximately 0%. The full width at half maximum of a peak that includes the lowest value is approximately 134 nm.

[Optical Components]

Color vision correction filter 1 described above is used for various optical components.

Figure 13:
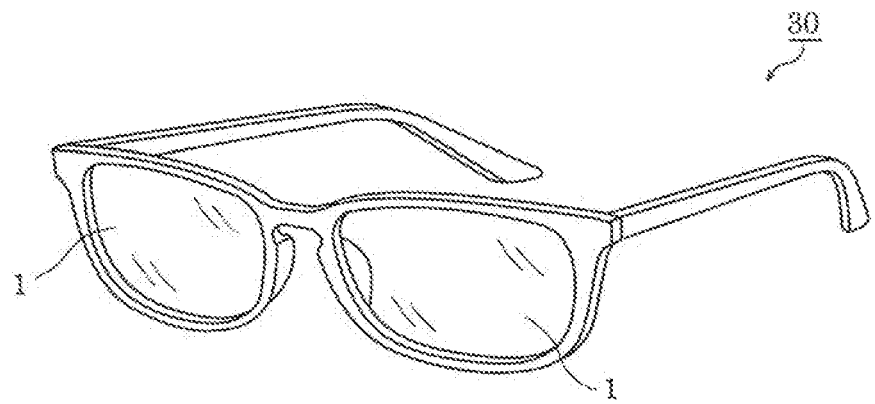
FIG. 13 is a perspective view illustrating a pair of glasses each including the color vision correction filter according to the embodiment.
Figure 14:
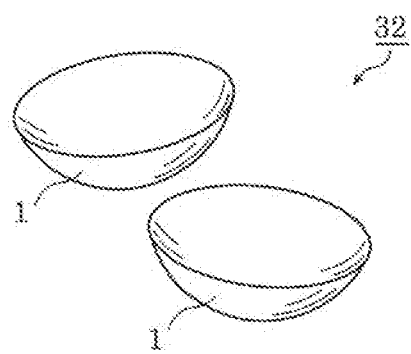
FIG. 14 is a perspective view illustrating a pair of contact lenses each including the color vision correction filter according to the embodiment.
Figure 15:
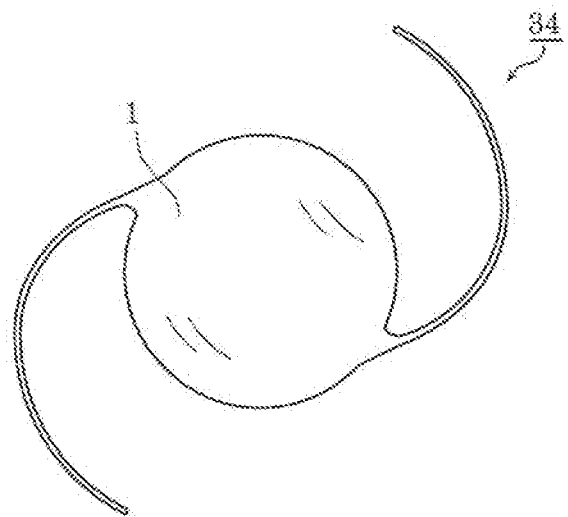
FIG. 15 is a plan view illustrating an intraocular lens that includes the color vision correction filter according to the embodiment.
Figure 16:
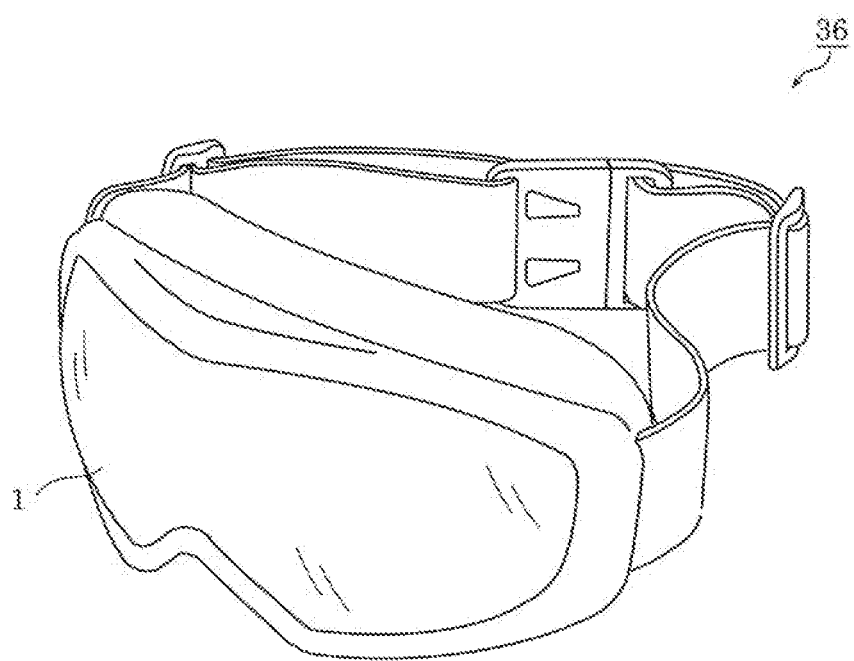
FIG. 16 is a perspective view illustrating a pair of goggles that includes the color vision correction filter according to the embodiment.

FIG. 13 through FIG. 16 each illustrate an example of an optical component that includes color vision correction filter 1 according to the present embodiment. Specifically, FIG. 13, FIG. 14, and FIG. 16 are each a perspective view illustrating pair of glasses 30, pair of contact lenses 32, or pair of goggles 36 as one example of the optical component. FIG. 15 is a plan view of intraocular lens 34 as one example of the optical component. For example, pair of glasses 30, pair of contact lenses 32, intraocular lens 34, and pair of goggles 36 each include at least one color vision correction filter 1, as illustrated in each of the drawings.

For example, pair of glasses 30 includes two color vision correction filters 1 as right and left lenses. Contact lens 32 or intraocular lens 34, as a whole, may be color vision correction filter 1. Alternatively, only the center of contact lens 32 or intraocular lens 34 may be color vision correction filter 1. Pair of goggles 36 includes one color vision correction filter 1 as a cover lens covering both eyes.

Note that the optical component that includes color vision correction filter 1 is not limited to pair of glasses 30, and the others listed above. The optical component may be, for example, a sun visor provided inside a vehicle. In other words, the optical component does not need to be a device wearable by a person.

[Advantageous Effects, etc.]

As has been described above, color vision correction filter 1 according to the present embodiment includes at least one type of dye material. The lowest value of the transmittance of color vision correction filter 1 in the wavelength band ranging from 440 nm to 600 nm may be in the range of plus or minus 50 nm of 535 nm.

This enables color vision correction filter 1 to inhibit the transmission of a wavelength component having a center wavelength at 535 nm (i.e., green light). The most common form of color vision deficiency is red-green color blindness with which individuals perceive green light stronger than red light. Since color vision correction filter 1 is capable of inhibiting the transmission of green light, it is possible to keep a perceptional balance between red light and green light, and thus correct color vision deficiency.

Color vision correction filter 1 inhibits the transmission of green light by containing dye materials. In other words, since it is not necessary to provide a partial reflection coating or the like on the surface of color vision correction filter 1, which has been a conventional case, it is possible to reduce reflectance at the surface. According to the present embodiment, it is thus possible to realize color vision correction filter 1 having a surface reflectance lower than that conventionally attained.

The lowest value of the transmittance of color vision correction filter 1 in the wavelength band ranging from 440 nm to 600 nm, inclusive, may be in the range of plus or minus 30 nm of 535 nm.

Since this makes it possible to inhibit the transmission of green light, it is possible to keep a perceptional balance between red light and green light, and thus correct color vision deficiency.

A bandwidth of a peak that includes the lowest value may be at least 30 nm and at most 115 nm for a predetermined value in the range in which the transmittance of color vision correction filter 1 is at least 40% and at most 60%.

This makes it possible to appropriately correct color vision deficiency according to the type and severity of color vision deficiency.

For example, a bandwidth of a peak that includes the lowest value may be at least 120 nm and at most 175 nm for a predetermined value in the range in which the transmittance of color vision correction filter 1 is at least 10% and at most 30%.

This makes it possible to appropriately correct color vision deficiency according to the type and severity of color vision deficiency.

At least one type of dye material may comprise a plurality of types of dye materials. In other words, color vision correction filter 1 may include dye materials of plural types.

This makes it possible to realize color vision correction filter 1 having desired spectral characteristics, by appropriately adjusting the types and concentrations of dye materials. This therefore makes it possible to appropriately correct color vision deficiency according to the type and severity of color vision deficiency.

At least one type of dye material may have a peak of absorption in the range from 415 nm to 590 nm, inclusive. A dye material of the first type included in at least one type of dye material may have a peak of absorption in the range from 415 nm to 425 nm, inclusive, and the full width at half maximum of the peak may be at least 20 nm and at most 45 nm. A dye material of the second type included in at least one type of dye material may have a peak of absorption in the range from 490 nm to 500 nm, inclusive, and the full width at half maximum of the peak may be at least 65 nm and at most 110 nm. A dye material of the third type included in at least one type of dye material may have a peak of absorption in the range from 490 nm to 505 nm, inclusive, and the full width at half maximum of the peak may be at least 70 nm and at most 110 nm. A dye material of the fourth type included in at least one type of dye material may have a peak of absorption in the range from 520 nm to 530 nm, inclusive, and the full width at half maximum of the peak may be at least 60 nm and at most 130 nm. A dye material of the fifth type included in at least one type of dye material may have a peak of absorption in the range from 540 nm to 550 nm, inclusive, and the full width at half maximum of the peak may be at least 70 nm and at most 125 nm. A dye material of the sixth type included in at least one type of dye material has a peak of absorption in the range from 570 nm to 580 nm, inclusive, and the full width at half maximum of the peak may be at least 25 nm and at most 80 nm. A dye material of the seventh type included in at least one type of dye material may have a peak of absorption in the range from 575 nm to 580 nm, inclusive, and the full width at half maximum of the peak may be at least 25 nm and at most 100 nm. A dye material of the eighth type included in at least one type of dye material may have a peak of absorption in the range from 580 nm to 590 nm, inclusive, and the full width at half maximum of the peak may be at least 45 nm and at most 120 nm.

By including, in color vision correction filter 1, at least one type of dye material selected from the dye materials of plural types as listed above, it is possible to realize color vision correction filter 1 capable of appropriately correcting color vision deficiency according to the type and severity of color vision deficiency.

At least one type of dye material may be a light-absorbing dye material. Since this makes it possible to restrain light, whose transmission has been inhibited, from being reflected back, it is possible to reduce the reflectance of the color vision correction filter.

The reflectance of color vision correction filter 1 may be at most 15%.

This makes it possible to realize a color vision correction filter having a sufficiently low reflectance.

At least one type of dye material may have an absorbance of at least 90 and at most 310. At least one type of material may have a basic skeleton of merocyanine, tetraazaporphyrin, or phthalocyanine.

Color vision correction filter 1 may include base material 10 that contains at least one type of dye material. Base material 10 may include a polycarbonate-based, cycloolefin-based, or acrylic resin. A total concentration of at least one type of dye material contained in base material 10 may be at least 20 ppm and at most 850 ppm. Base material 10 may have a thickness of at least 1 mm and at most 3 mm. Base material 10 may have a radius of curvature of at least 60 mm and at most 800 mm.

At least one type of dye material may be evenly dispersed in base material 10.

An optical component according to present embodiment may include color vision correction filter 1. The optical component may be pair of glasses 30, contact lens 32, intraocular lens 34, or pair of goggles 36.

Thus, it is possible to realize an optical component, such as pair of glasses 30, wearable by a person. According to the present embodiment, pair of glasses 30 that includes color vision correction filters 1 as lenses is achieved. Supposing here the case where a person wears a pair of glasses with a high surface reflectance, it might be difficult to see the wearer's eyes because the eyes are hidden behind the lenses, and this might cause some troubles during a conversation, e.g., difficulty in reading facial expressions. In contrast, since the surface reflectance of color vision correction filter 1 is low, it is possible to have a conversation with a person wearing pair of glasses 30 while looking at the eyes of the person, and this can reduce discomfort in everyday life.

[Others]

Although the color vision correction filter and the optical component according to the present disclosure have been described based on the above-described embodiment, the present disclosure is not limited to the above-described embodiment.

For example, the eight types of dye materials C1 through C8 are illustrated in the above-described embodiment, but the dye materials contained in color vision correction filter 1 are not limited to these. Color vision correction filter 1 may contain dye materials of types that are different from those of dye materials C1 through C8.

In the above-described embodiment, although color vision correction filters 1 each containing two to four types of dye materials are described as Examples 1 through 4, the number of types of dye materials contained in color vision correction filter 1 is not limited to such. Color vision correction filter 1 may contain only one type or at least five types of dye materials.

Although the above-described embodiment has illustrated an example such that a basic skeleton of each of the dye materials is of merocyanine or tetraazaporphyrin, the basic skeleton is not limited to such. Any dye materials may be used provided that they have the above-described spectral characteristics.

Forms obtained by various modifications to the exemplary embodiment that can be conceived by a person of skill in the art as well as forms realized by arbitrarily combining structural components and functions in the exemplary embodiment which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A color vision correction filter, comprising:
at least one type of dye material, wherein
the at least one type of dye material has a basic skeleton of merocyanine,
a wavelength at which transmittance of the color vision correction filter is lowest in a wavelength band ranging from 440 nm to 600 nm, inclusive, is in a range of plus or minus 50 nm of 535 nm.

2. The color vision correction filter according to claim 1, wherein
the wavelength at which the transmittance of the color vision correction filter is lowest in the wavelength band ranging from 440 nm to 600 nm, inclusive, is in a range of plus or minus 30 nm of 535 nm.

3. The color vision correction filter according to claim 1, wherein
a bandwidth of a peak that includes the lowest value is at least 30 nm and at most 115 nm for a predetermined value in a range in which the transmittance of the color vision correction filter is at least 40% and at most 60%.

4. The color vision correction filter according to claim 1, wherein
a bandwidth of a peak that includes the lowest value is at least 120 nm and at most 175 nm for a predetermined value in a range in which the transmittance of the color vision correction filter is at least 10% and at most 30%.

5. The color vision correction filter according to claim 1, wherein
the at least one type of dye material comprises a plural types of dye materials.

6. The color vision correction filter according to claim 1, wherein
the at least one type of dye material is a light-absorbing material.

7. The color vision correction filter according to claim 6, wherein
the at least one type of dye material has a peak of absorption in a range from 415 nm to 590 nm, inclusive.

8. The color vision correction filter according to claim 6, wherein
a dye material included in the at least one type of dye material has a peak of absorption in a range from 415 nm to 425 nm, inclusive, and a full width at half maximum of the peak is at least 20 nm and at most 45 nm.

9. The color vision correction filter according to claim 6, wherein
a dye material included in the at least one type of dye material has a peak of absorption in a range from 490 nm to 500 nm, inclusive, and a full width at half maximum of the peak is at least 65 nm and at most 110 nm.

10. The color vision correction filter according to claim 6, wherein
a dye material included in the at least one type of dye material has a peak of absorption in a range from 490 nm to 505 nm, inclusive, and a full width at half maximum of the peak is at least 70 nm and at most 105 nm.

11. The color vision correction filter according to claim 6, wherein
a dye material included in the at least one type of dye material has a peak of absorption in a range from 520 nm to 530 nm, inclusive, and a full width at half maximum of the peak is at least 60 nm and at most 130 nm.

12. The color vision correction filter according to claim 6, wherein
a dye material included in the at least one type of dye material has a peak of absorption in a range from 540 nm to 550 nm, inclusive, and a full width at half maximum of the peak is at least 70 nm and at most 125 nm.

13. The color vision correction filter according to claim 6, wherein
a dye material included in the at least one type of dye material has a peak of absorption in a range from 570 nm to 580 nm, inclusive, and a full width at half maximum of the peak is at least 25 nm and at most 80 nm.

14. The color vision correction filter according to claim 6, wherein
a dye material included in the at least one type of dye material has a peak of absorption in a range from 575 nm to 585 nm, inclusive, and a full width at half maximum of the peak is at least 25 nm and at most 100 nm.

15. The color vision correction filter according to claim 6, wherein
a dye material included in the at least one type of dye material has a peak of absorption in a range from 580 nm to 590 nm, inclusive, and a full width at half maximum of the peak is at least 45 nm and at most 120 nm.

16. The color vision correction filter according to claim 1, wherein
reflectance of the color vision correction filter is at most 15%.

17. The color vision correction filter according to claim 1, wherein
the at least one type of dye material has an absorbance of at least 90 and at most 310, and
the at least one type of dye material has a basic skeleton of merocyanine, tetraazaporphyrin, or phthalocyanine.

18. The color vision correction filter according to claim 1, further comprising:
a base material that contains the at least one type of dye material, wherein
the base material includes a polycarbonate-based, cycloolefin-based, or acrylic resin,
a total concentration of the at least one type of dye material contained in the base material is at least 20 ppm and at most 850 ppm,
the base material has a thickness of at least 1 mm and at most 3 mm, and
the base material has a radius of curvature of at least 60 mm and at most 800 mm.

19. The color vision correction filter according to claim 18, wherein
the at least one type of dye material is evenly dispersed in the base material.

20. An optical component, comprising:
the color vision correction filter according to claim 1.

21. The optical component according to claim 20, wherein
the optical component is a pair of eyeglasses, a contact lens, an intraocular lens, or a pair of goggles.

* * * * *